United States Patent [19]

Sugino

[11] Patent Number: 4,725,046
[45] Date of Patent: Feb. 16, 1988

[54] ENGINE MOUNT

[75] Inventor: Masaru Sugino, Fujisawa, Japan

[73] Assignee: Nissan Motor Co., Ltd., Yokohama, Japan

[21] Appl. No.: 8,058

[22] Filed: Jan. 9, 1987

Related U.S. Application Data

[63] Continuation of Ser. No. 591,416, Mar. 20, 1984, abandoned.

[30] Foreign Application Priority Data

Mar. 22, 1983 [JP] Japan .................. 58-39581[U]

[51] Int. Cl.⁴ ............................................. B60K 7/12
[52] U.S. Cl. .............................. 267/140.1; 188/267; 248/565; 267/35; 267/136; 267/195
[58] Field of Search ............. 267/140.1–140.5, 267/141.1–141.7, 63 R, 8 R, 64.15, 35, 152, 136, 141; 248/56 L, 636, 638, 565; 180/312; 188/267, 322.13

[56] References Cited

U.S. PATENT DOCUMENTS

| | | | |
|---|---|---|---|
| 2,382,372 | 8/1945 | Wallerstein | 267/140.2 |
| 2,730,356 | 1/1956 | Hunter | 267/141 X |
| 3,110,553 | 11/1963 | Kniffin | 267/141 X |
| 3,836,134 | 9/1974 | Lowe et al. | 267/152 |
| 4,151,822 | 5/1979 | Miura et al. | 248/612 X |
| 4,432,441 | 2/1984 | Kurokawa | 267/140.1 X |

FOREIGN PATENT DOCUMENTS

| | | | |
|---|---|---|---|
| 2927757 | 2/1981 | Fed. Rep. of Germany | 267/8 R |
| 3024921 | 3/1982 | Fed. Rep. of Germany | |
| 833798 | 10/1938 | France | 267/141 |
| 137738 | 8/1982 | Japan | 267/140.1 |
| 176672 | 4/1984 | Japan | 267/140.1 |
| 449186 | 12/1975 | U.S.S.R. | 267/152 |
| 579477 | 11/1977 | U.S.S.R. | 267/140.1 |
| 750172 | 7/1980 | U.S.S.R. | 267/151 |
| 859716 | 9/1981 | U.S.S.R. | 267/140.1 |

Primary Examiner—George E. A. Halvosa
Assistant Examiner—Matthew C. Graham
Attorney, Agent, or Firm—Schwartz, Jeffery, Schwaab, Mack, Blumenthal & Evans

[57] ABSTRACT

Disclosed herein is an improved engine mount which comprises first and second retaining members which are separated from each other, a first shock absorbing elastomer block disposed between the first and second retaining members, a highly magnetic member connected to the first retaining member to move therewith, and a magnet connected to the other of the first and a magnet connected to the second retaining member to move therewith leaving a certain clearance between the magnet and the highly magnetic member. The magnet is arranged and oriented to effectively attract the highly magnetic member thereby to compress the first shock absorbing elastomer block.

10 Claims, 10 Drawing Figures

ENGINE MOUNT

This application is a continuation of application Ser. No. 591,416, filed Mar. 20, 1984, now abandoned.

BACKGROUND OF THE INVENTION

1. Field of the Invention

The present invention relates in general to a shock absorber and more particularly to an engine mount through which an automotive engine unit is mounted to the vehicle body.

2. Description of the Prior Art

Usually, automotive engines are mounted to the vehicle bodies through rubber insulators which are arranged and constructed to absorb or block the vibration transmission from the engine unit to the vehicle body or vice versa. However, as will be described hereinafter, some of the conventional rubber insulators, viz., engine mounts fail to exhibit satisfied performance particularly against the vibration which is transmitted from the engine unit to the vehicle body.

SUMMARY OF THE INVENTION

It is therefore an object of the present invention to provide an improved engine mount which exhibits satisfied vibration absorbing performance particularly against the vibration which is transmitted from the engine unit to the vehicle body.

According to the present invention, there is provided an engine mount for mounting an engine unit on a vehicle body, which comprises first and second retaining members which are separated from each other, the first and second retaining members being connected respectively to the engine unit and the vehicle body or vice versa, a first shock absorbing block of elastomer disposed between the first and second retaining members, a magnetic member connected to the first retaining member to move therewith, and a magnet connected to the second retaining member to move therewith leaving a certain clearance between the magnet and the magnetic member, the magnet being arranged and oriented to effectively attract the magnetic member thereby to compress the first shock absorbing block.

BRIEF DESCRIPTION OF THE DRAWINGS

Other objects and advantages of the present invention will become apparent from the following description when taken in conjunction with the accompanying drawings, in which.

DESCRIPTION OF A PRIOR ART ENGINE MOUNT

Figure 1:
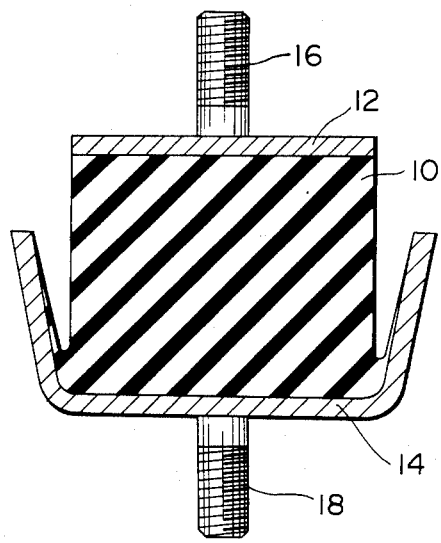
FIG. 1 is a sectional view of a conventional engine mount.
Figure 2:
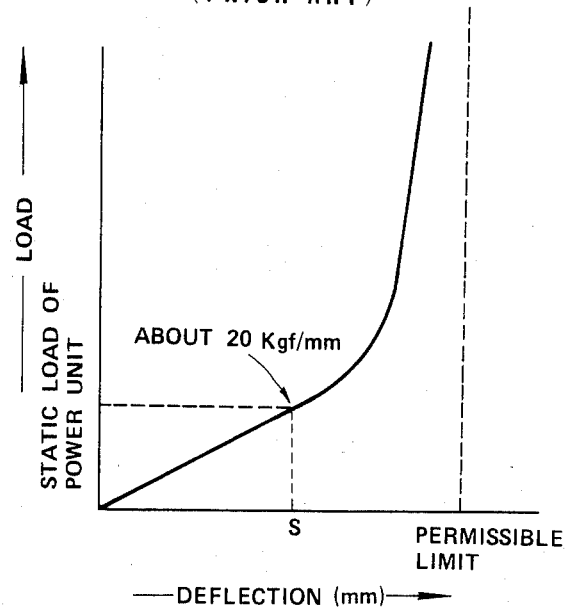
FIG. 2 is a graph showing the deflection characteristics of the conventional engine mount of FIG. 1 under varying loads.

Prior to describing in detail the invention, a conventional engine mount will be outlined with reference to FIGS. 1 and 2 in order to clarify the invention.

Referring to FIG. 1, there is shown a conventional engine mount. The engine mount comprises generally a block 10 of elastomer, such as rubber, which is disposed between two retaining plates 12 and 14 to which it is bonded or vulcanized. Mounting bolts 16 and 18 are respectively secured to the retaining plates 12 and 14 and extend therefrom in the opposite directions. Upon assembly, the upper retaining plate 12 is bolted to a mounting bracket (not shown) of the engine unit and the lower retaining plate 14 is bolted to a supporting bracket (not shown) of the vehicle body, so that the mounting of the engine unit on the vehicle body is achieved through the elastomer block 10.

However, it has been revealed that the engine mount of the above-mentioned type is particularly poor in absorbing or blocking the vibration which is transmitted from the engine unit to the vehicle body. This undesirable phenomenon is seen from the graph of FIG. 2 which indicates the deflection characteristics of this type engine mount under varying loads. As is understood from this graph, the engine mount shows a relatively high spring constant (about 20 kgf/mm) at the deflection produced when a static load of the engine unit is applied thereto. As is known, in general, the blocking ability of a shock absorber against the vibration produced by the engine reduces as the spring constant thereof increases. Thus, hitherto, many attempts have been carried out to provide the engine mount under compressed condition with a smaller spring constant. However, nevertheless, some of them fail to exhibit the performance to the satisfied levels.

DETAILED DESCRIPTION OF THE INVENTION

Therefore, to provide the engine mount under compressed condition with a smaller spring constant is an essential object of the present invention. In the following, the present invention will be described in detail with reference to FIGS. 3 to 10.

Figure 3:
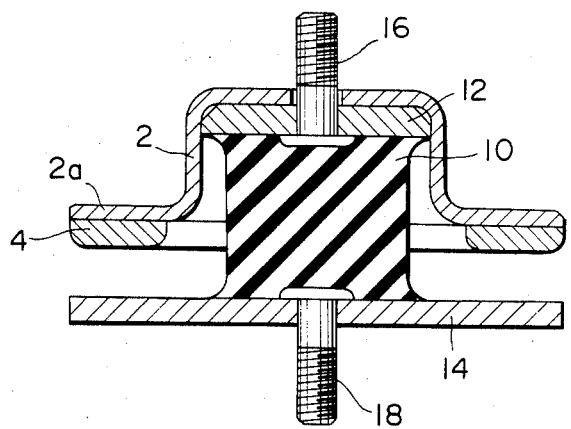
FIG. 3 is a sectional view of a first embodiment of the engine mount according to the present invention.

Referring to FIG. 3, there is shown a first embodiment of the engine mount of the present invention. The engine mount of this embodiment comprises a block 10 of elastomer, such as rubber, which is coaxially disposed between two parallel circular plates 12 and 14 to which it is bonded or vulcanized. The diameter of the plate 14 is greater than that of the other plate 12, as shown. The plate 14 is constructed of a highly magnetic material such as soft iron. Two mounting bolts 16 and 18 are respectively secured to the plates 12 and 14. Upon assembly, the bolt 16 is connected to a mounting bracket (not shown) of the engine unit, while, the other bolt 18 is connected to a supporting bracket (not shown) of the vehicle body proper, so that the mounting of the engine unit to the vehicle body is effected through the elastomer block 10. A cup-shaped member 2 having an annular flange portion 2a is coaxially connected to the plate 12 with the flange portion 2a protruded toward the plate 14, as shown. An annular magnet 4 is coaxially fixed to the flange portion 2a and oriented to positively attract the plate 14.

In the following, function of the first embodiment will be described with reference to the graph of FIG. 4 which shows the deflection characteristics of it under varying loads.

As is seen from this graph, by the function of the magnet 4, the deflection rate of the engine mount increases acceleratively as the load applied thereto increases. This is because the deflection characteristics of the first embodiment is provided by combining the characteristics "B" of the elastomer block 10 per se and that "M" of the magnet 4. Thus, a smaller spring constant can be established at the high deflection region "E", viz., at the deflection produced when the static load of the engine unit is practically applied to the engine mount. That is, the spring constant $K_E$ at the region "E" is expressed by $K_E = K_B + K_M$, wherein $K_B$ is the spring constant of the elastomer block 10, while $K_M$ is that of the magnet 4 which is negative. Thus, in normally experienced vibrational ranges, the engine mount of this first embodiment exhibits outstanding shock absorbing performance. However, due to its inherent construction, the engine mount has the following drawback.

Figure 4:
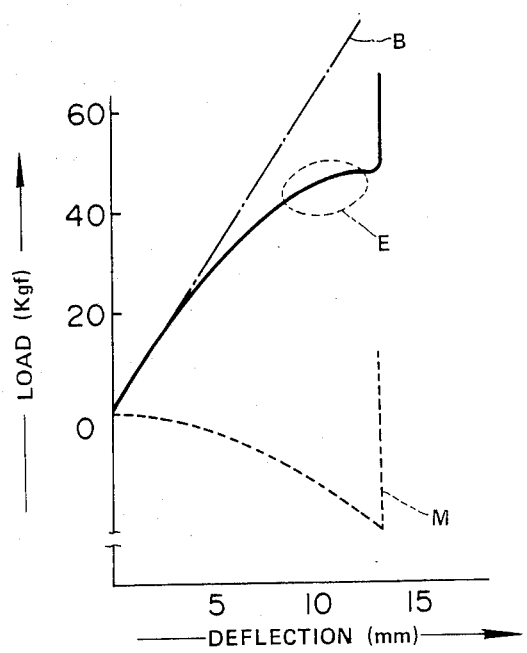
FIG. 4 is a graph showing the deflection characteristics of the engine mount of the first embodiment (FIG. 3) under varying loads.

That is, as is seen from the graph of FIG. 4, when the engine mount is suddenly applied with a great shock or great kinetic load to such a degree that the magnet 4 is brought into contact with the plate 14, the load increases infinitely. In this condition, the shock absorbing function of the engine mount disappears completely.

The following description is directed to second, third, fourth and fifth embodiments of the present invention which are free of the above-mentioned drawback of the first embodiment.

Figure 5:
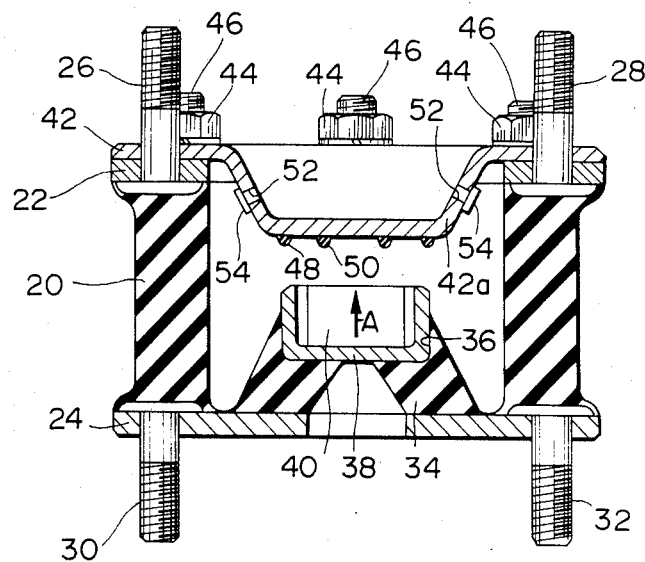
FIG. 5 is a sectional view of a second embodiment of the engine mount of the present invention.

Referring to FIG. 5, there is shown a second embodiment of the engine mount of the present invention. The engine mount of this embodiment comprises a tubular block 20 of elastomer, such as rubber, which is coaxially disposed between two parallel annular plates 22 and 24 to which it is bonded or vulcanized. The outer diameters of the plates 22 and 24 are substantially equal to each other. Two mounting bolts 26 and 28 (or 30 and 32) are secured to the plate 22 (or 24) and extend parallelly therefrom outwardly. Preferably, the bolts 26 and 28 (or 30 and 32) are arranged at the diametrically opposed positions of the plate 22 (or 24). Similar to the case of the first embodiment of FIG. 3, the mounting bolts 26 and 28 are used for bolting the engine mount to the mounting bracket (not shown) of the engine unit, and the other mounting bolts 30 and 32 are used for bolting the engine mount to the supporting bracket (not shown) of the vehicle body. A generally frusto-conical block 34 of elastomer is coaxially disposed at its enlarged diameter side on the inboard surface of the plate 24. Vulcanizing technique may be employed for securing the block 34 to the plate 24. The top portion of the block 34 is formed with a circular recess 36 into which is tightly received a circular holder 38 constructed of a highly magnetic material such as soft iron. Within the holder 38 is received a cylindrical rare-earth magnet 40 which is bonded to the bottom of the holder 38 by a known bonding techique. The magnet 40 is oriented in such a manner that the line of magnetic force thereof has a direction indicated by the arrow "A". That is to say, the magnet 40 is so arranged and oriented as to attract a magnetic substance located above it. If desired, a number of rare-earth magnets may be arranged in the holder to produce increased magnetic force. A circular dished pate 42 of highly magnetic material is coaxially secured to the upper annular plate 22 by nuts 44 and bolts 46. If desired, the connection of the circular dished plate 42 to the upper annular plate 22 may be made by caulking. The dished portion 42a of the plate 42 is protruded toward the magnet 40, but it keeps a predetermined distance from the magnet 40 even when the static load of the engine unit is applied to the engine mount. The dished portion 42a is provided with annular projections 48 and 50 of elastomer which are vulcanized thereto. The mechanical strength viz., the thickness of each part used in the engine mount should be determined by considering the maximum load which may be applied thereto in practical use. The dished portion 42a of the plate 42 is formed with air breathing openings 52, each having an air filter 54 connected thereto.

In the following, function of the engine mount of the second embodiment will be described with reference to the graph of FIG. 6 which shows the deflection characteristics of an engine mount in which the spring constants of the tubular elastomer block 20 and the frusto-conical block 34 are 8 kgf/mm and 20 kgf/mm, respectively, and the magnet 40 is a cylindrical cobalt magnet having a size of 20 mm in diameter and 20 mm in length.

As is seen from the graph, like the case of the first embodiment, the deflection rate of the engine mount of the second embodiment increases acceleratively as the load applied thereto increases. This is because the deflection characteristics of this second embodiment is provided by combining the characteristics "B" of the elastomer block 20 per se and the characteristics "B'+M" of a spring system consisting of the magnet M and the other elastomer block 34. The characteristics of the magnet 40 per se is shown by the broken line M. Thus, like the case of the first embodiment, a smaller spring constant is established at the high deflection region "E", viz., at the deflection produced when the static load of the engine unit is practically applied to the engine unit. In this case, the spring constant $K_E$ at the region "E" is expressed by the following equation:

$$K_E = K_{20} + \cfrac{1}{\cfrac{1}{K_{40}} + \cfrac{1}{K_{34}}}$$

wherein, $K_{20}$ is the spring constant of the elastomer block 20, $K_{40}$ is that of the magnet 40 which is negative, and $K_{34}$ is that of the other elastomer block 34.

Thus, in normally experienced vibrational ranges, the engine mount of this second embodiment exhibits outstanding shock absorbing performance, like the case of the first embodiment. Furthermore, in the second embodiment, the undesirable sudden disappearance of the shock absorbing function which would occur in the first embodiment is eliminated by the following reasons.

Figure 6:
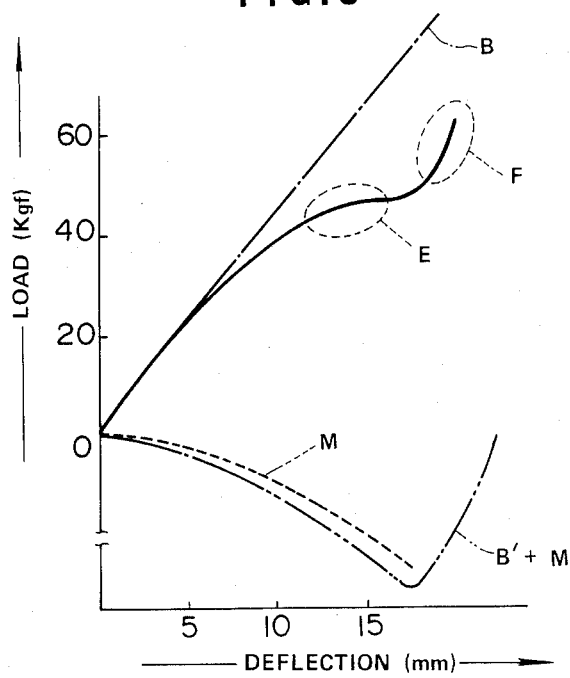
FIG. 6 is a graph showing the deflection characteristics of the engine mount of the second embodiment (FIG. 5) under varying loads.

That is, as is seen from the graph of FIG. 6, when the engine mount is suddenly applied with a great shock or great kinetic load to such a degree that dished portion 42a of the plate 42 is brought into contact with the magnet 40, the frusto-conical block 34 is compressed to absorb the shock with a spring constant $K_F$ which is expressed by $K_F = K_{20} + K_{34}$. This desirable phenomenon is clearly shown at section "F" of the graph.

The provision of the shock absorbing projections 48 and 50 on the dished portion 42a of the plate 42 promotes smooth transition from the shock absorbing achieved with the shock absorbing achieved with the spring constant $K_E$ to that achieved with the spring constant $K_F$.

Figure 7:
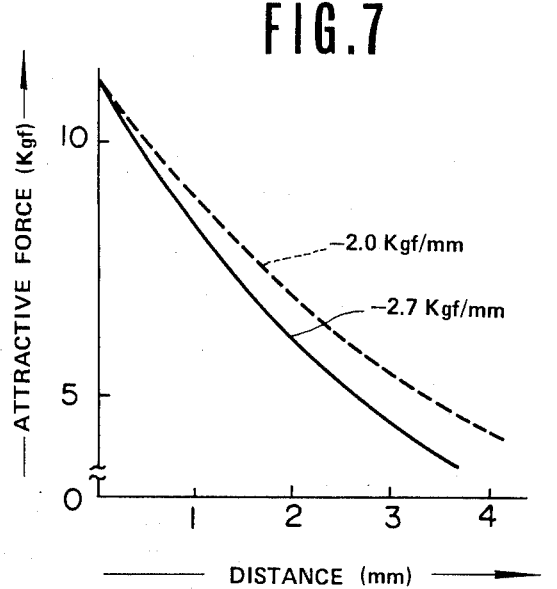
FIG. 7 is a graph showing the attractive force characteristics of magnet means employed in the second embodiment with respect to the distance between the magnet means and a magnetic member.

FIG. 7 is a graph showing attractive force generated by the magnet 40 under varying distances between the dished portion 42a and the magnet 40 of the second embodiment. Indicated by the broken line is the characteristics of the magnet 40 per se, while indicated by the solid line is the characteristics of the spring system consisting of the frusto-conical block 34, the magnet 40 and the dished plate 42. As is seen from the graph, in the spring system, the negative spring constant thereof can be remarkably changed by only changing the spring constant $K_{34}$ of the frusto-conical block 34. Thus, it is easy to select a magnet 40 appropriate for the desired specification of the engine mount.

Figure 8:
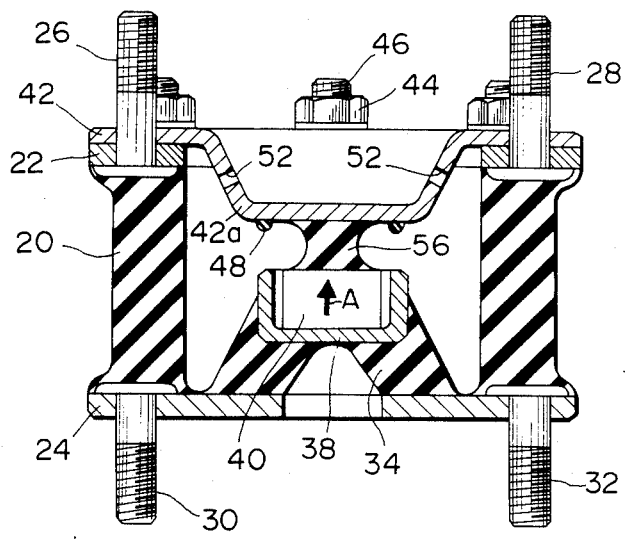
FIGS. 8, 9 and 10 are views similar to FIG. 5, but showing third, fourth and fifth embodiments of the present invention.

Referring to FIG. 8, there is shown a third embodiment of the present invention. The same parts as those of the second embodiments are designated by the same numerals. As is seen from the drawing, the engine mount of this third embodiment is substantially the same in construction as the second embodiment except for an additional block 56 of elastomer which is disposed between the magnet 40 and the dished portion of the plate 42. The additional block 56 is constructed of a soft elastomer, such as rubber sponge or foamed polyurethane having a relatively small spring constant. With this construction, the transition from the shock absorbing achieved with the spring constant $K_E$ to that achieved with the spring constant $K_F$ is much more smoothly carried out. Preferably, the upper surface of the magnet 40 is entirely covered with the block 56 as shown. In this case, the magnetically sensitive portion of the magnet 40 can be protected from being contaminated with dust.

Figure 9:
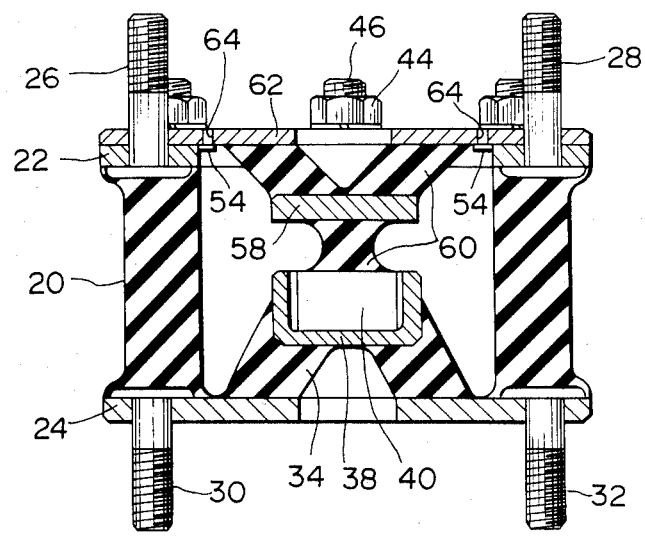

Referring to FIG. 9, there is shown a fourth embodiment of the present invention. In this embodiment, a circular magnetic member 58 is disposed in another frusto-conical block 60 of elastomer which extends from the magnet 40 to a flat circular plate 62. The flat circular plate 62 is secured to the upper annular plate 22 by nuts 44 and bolts 46. With this, the mass consisting of the magnet 40, the holder 38 and the magnetic member 58 and the spring element consisting of the frusto-conical blocks 34 and 60 form a so-called resonance system which is usable as a dynamic damper for absorbing the vibration of specified frequency. Designated by numerals 64 are air breathing openings formed in the plate 62, each having an air filter 54 connected thereto.

Figure 10:
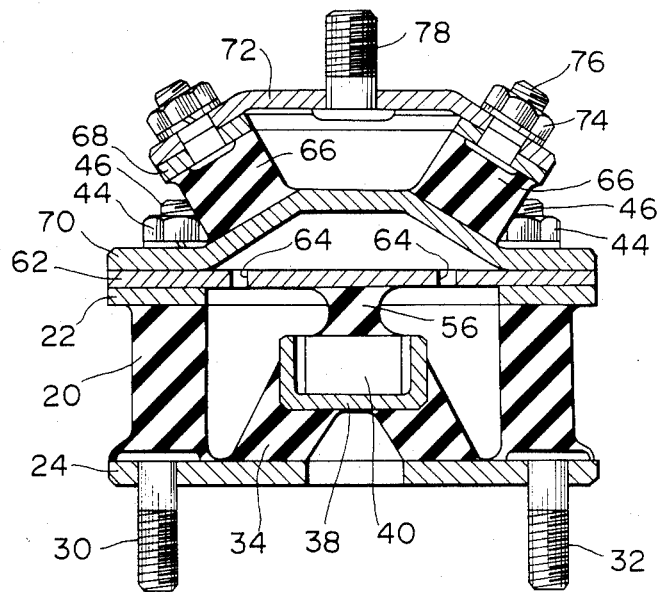

Referring to FIG. 10, there is shown a fifth embodiment of the present invention. The engine mount of this embodiment comprises a lower part which has substantially the same construction as the engine mount of the third embodiment (FIG. 8) and an upper part which is mounted on the lower part in series. The upper part comprises a plurality of parallel blocks 66 of elastomer which are disposed between an upper annular plate 68 and a lower circular dished plate 70. Each block 66 is secured to the plates 68 and 70 by vulcanization. The lower dished plate 70 is secured to the circular plate 62 of the lower part by the nuts 44 and bolts 46. A circular dished plate 72 is coaxially connected to the annular plate 68 by nuts 74 and bolts 76. A mounting bolt 78 is secured to the plate 72 and extends therefrom outwardly. By the provision of the upper part, the shock absorbing function of this fourth embodiment is more effectively achieved. If desired, an air spring element may be employed as a substitute for the upper part.

What is claimed is:

1. An engine amount for mounting an engine unit on a vehicle body, comprising:
   first and second retaining members which are separated from each other, one of said first and second retaining members being mounted to said vehicle body and the other member being mounted to said engine unit;
   a first shock absorbing block of elastomer disposed between said first and second retaining members;
   a highly magnetic member mounted on said second retaining member to move therewith;
   a permanent magnet mounted to said first retaining member to move therewith leaving a space between said permanent magnet and said magnetic member, said permanent magnet being arranged and oriented to effectively attract said magnetic member, thereby to compress said first shock absorbing block;
   a second shock absorbing block of elastomer interposed between said magnet and said first retaining member, wherein said magnet is attracted to said magnetic member to apply a negative load to said second shock absorbing block when a static load of the engine unit is applied to the engine mount; and
   a holder through which said magnet is mounted to said second shock absorbing block, said holder being constructed of a magnetic material;
   wherein said first shock absorbing block is a tubular elastomer block within which a unit comprising said second shock absorbing block, said magnet and said holder is arranged;
   wherein said second shock absorbing block is a frusto-conical elastomer block which is coaxially disposed in the tubular elastomer of said first shock absorbing block;
   wherein said magnetic member has a dished portion which is projected toward said magnet disposed on said second shock absorbing block; and
   wherein said projected side of said dished portion of said magnetic member is provided with shock absorbing elastomer members which contact said magnet when the displacement of said magnet member toward said magnet exceeds a predetermined displacement.

2. An engine mount as claimed in claim 1, in which said highly magnetic member is formed with air breathing openings through which the interior of said tubular first shock absorbing block is communicated with the atmosphere.

3. An engine mount as claimed in claim 2, in which each of said air breathing openings is provided with an air filter.

4. An engine mount as claimed in claim 2, further comprising a third shock absorbing block of elastomer which is disposed between the dished portion of said highly magnetic member and said magnet.

5. An engine amount for mounting an engine unit on a vehicle body, comprising:
   first and second retaining members which are separated from each other, one of said first and second retaining members being mounted to said vehicle body and the other member being mounted to said engine unit;
   a first shock absorbing block of elastomer disposed between said first and second retaining members;
   a highly magnetic member mounted on said second retaining member to move therewith;

a permanent magnet mounted to said first retaining member to move therewith leaving a space between said permanent magnet and said magnetic member, said permanent magnet being arranged and oriented to effectively attract said magnetic member, thereby to compress said first shock absorbing block;

a second shock absorbing block of elastomer interposed between said magnet and said first retaining member, wherein said magnet is attracted to said magnetic member to apply a negative load to said second shock absorbing block when a static load of the engine unit is applied to the engine mount; and a holder through which said magnet is mounted to said second shock absorbing block, said holder being constructed of a magnetic material;

wherein said first shock absorbing block is a tubular elastomer block within which a unit comprising said second shock absorbing block, said magnet and said holder is arranged;

wherein said second shock absorbing block is a frusto-conical elastomer block which is coaxially disposed in the tubular elastomer of said first shock absorbing block;

wherein said magnetic member is formed with air breathing openings through which the interior of said tubular first shock absorbing block is communicated with the atmosphere; and wherein said engine mount further comprises a third shock absorbing block of elastomer which is disposed between said magnetic member and said magnet.

6. An engine mount as claimed in claim 5, further comprising an additional shock absorbing device which is mounted in series to said tubular first shock absorbing block through said first retaining member, said additional absorbing device comprising shock absorbing blocks of elastomer which are parallel between two parallel retaining members one of which is secured to said first retaining member.

7. An engine mount for mounting an engine unit on a vehicle body comprising:

first and second retaining members which are separated from each other, one of said first and second members being mounted to said vehicle body and the other member being mounted to said engine unit;

a first shock absorbing block of elastomer disposed between said first and second retaining members;

a highly magnetic member mounted on said second retaining member to move therewith;

a permanent magnet mounted to said first retaining member to move therewith leaving a space between said permanent magnet and said magnetic member, thereby to compress said second shock absorbing block;

a second shock absorbing block of elastomer interposed between said magnet and said first retaining member; and a holder through which said magnet is mounted to said second shock absorbing block, said holder being constructed of a magnetic material;

wherein said first shock absorbing block is a tubular elastomer block within which a unit comprising said second shock absorbing block, said magnet and said holder is arranged;

wherein said second shock absorbing block is a frusto-conical elastomer block which is coaxially disposed in the tubular elastomer of said first shock absorbing block, and wherein said magnetic member is a circular magnetic member which is disposed in a third shock absorbing block of elastomer, said third shock absorbing block being disposed between said magnet and a retainer secured to said first retaining member, so that the connections of said circular magnetic member to said magnet and said retainer are connected by a lower portion and an upper portion of said third shock absorbing block, respectively.

8. An engine mount as claimed in claim 7, in which said retainer is formed with air breathing openings through which the interior of said tubular first shock absorbing block is communicated with the atmosphere.

9. An engine block as claimed in claim 8, in which each of said air breathing openings is provided with an air filter.

10. An engine block as claimed in claim 9, in which said upper portion of said third shock absorbing block is a frusto-conical elastomer block which is coaxially disposed in the tubular first shock absorbing block.

* * * * *